Feb. 1, 1966 H. B. F. JENSEN 3,231,989
AUTOMATION OF MACHINE TOOLS
Filed April 22, 1960 10 Sheets-Sheet 1

INVENTOR.
HERMANN BØRGE FUNCK JENSEN
BY Dicke & Craig
ATTORNEYS

Feb. 1, 1966 H. B. F. JENSEN 3,231,989
AUTOMATION OF MACHINE TOOLS
Filed April 22, 1960 10 Sheets-Sheet 6

INVENTOR.
HERMANN BØRGE FUNCK JENSEN
BY
Dicke & Craig
ATTORNEYS

Feb. 1, 1966  H. B. F. JENSEN  3,231,989
AUTOMATION OF MACHINE TOOLS

Filed April 22, 1960  10 Sheets-Sheet 9

INVENTOR.
HERMANN BØRGE FUNCK JENSEN
BY *Dicke & Craig*
ATTORNEYS

United States Patent Office 3,231,989
Patented Feb. 1, 1966

3,231,989
AUTOMATION OF MACHINE TOOLS
Hermann Børge Funck Jensen, 100 Otto Ruudsgade, Arhus, Denmark
Filed Apr. 22, 1960, Ser. No. 24,063
Claims priority, application Great Britain, Apr. 27, 1959, 14,234/59
15 Claims. (Cl. 35—13)

This is a continuation-in-part application of my application Serial No. 689,620, filed October 11, 1957, now abandoned.

The invention relates to a method for laying out the automation involving the sequence of operation of a machine tool having a plurality of machine functions and to the equipment necessary to carry out such method.

It is a purpose of the invention to provide a method which is useful in educating and training personnel to be engaged in the automation of machine tools.

It is a further purpose of the invention to provide an automation kit for a machine tool which is useful in planning the automation.

It is still a further purpose of the invention to provide an automation kit which includes operative automation components.

It is still a further purpose of the invention to provide an automation kit which closely imitates the automation equipment on the machine tool itself.

It is still a further purpose of the invention to provide an automation kit by means of which pilot automation equipment can be constructed.

It is still a further purpose of the invention to provide an automation kit which provides the structure of the pilot equiment in a manner which enables the personnel or group working on the automation to have a good survey of the problems.

Figure 1:
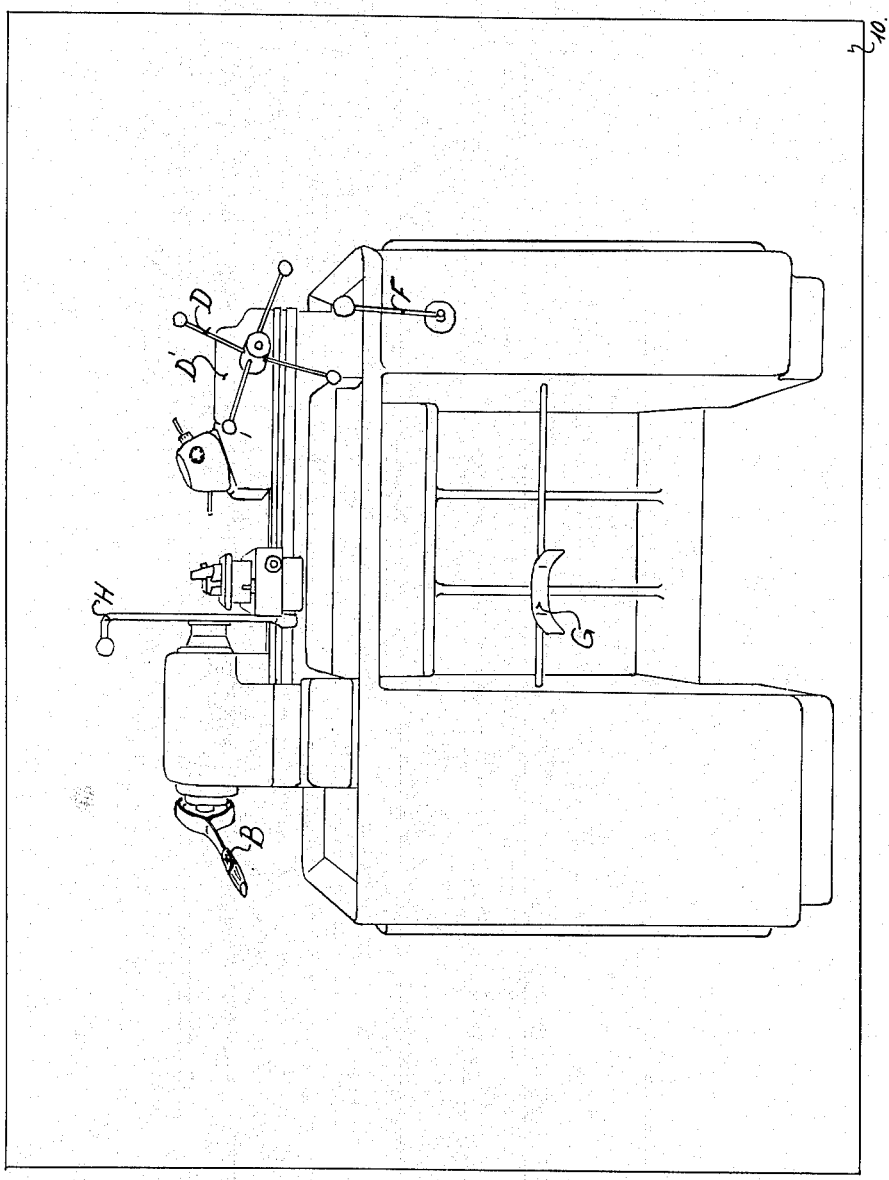
Figure 2:
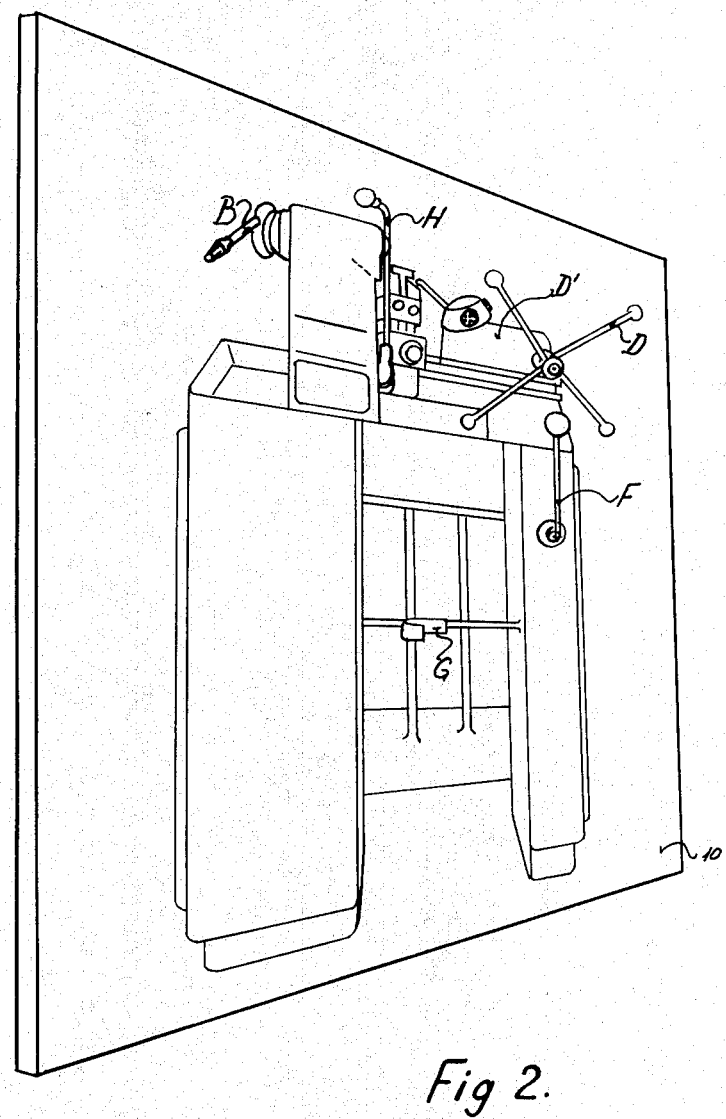
Figure 3:
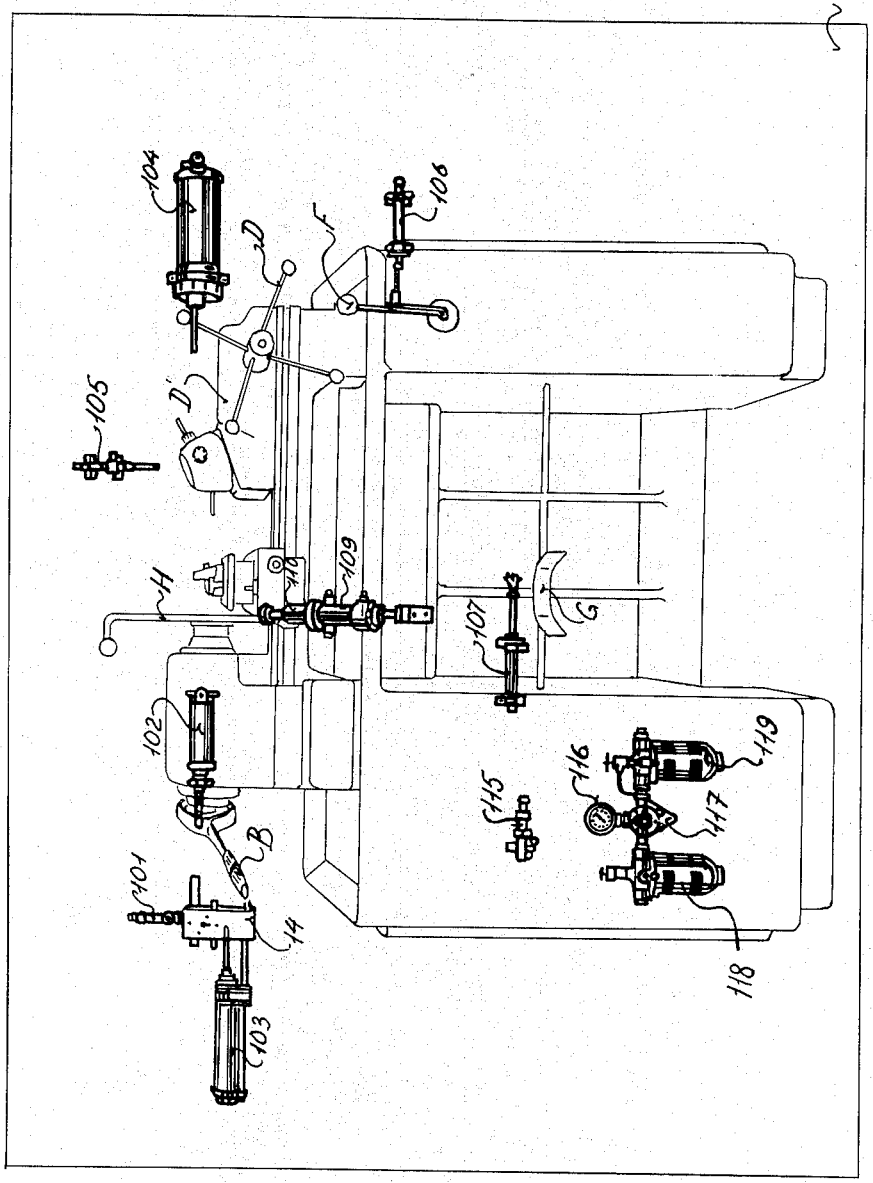
Figure 4:
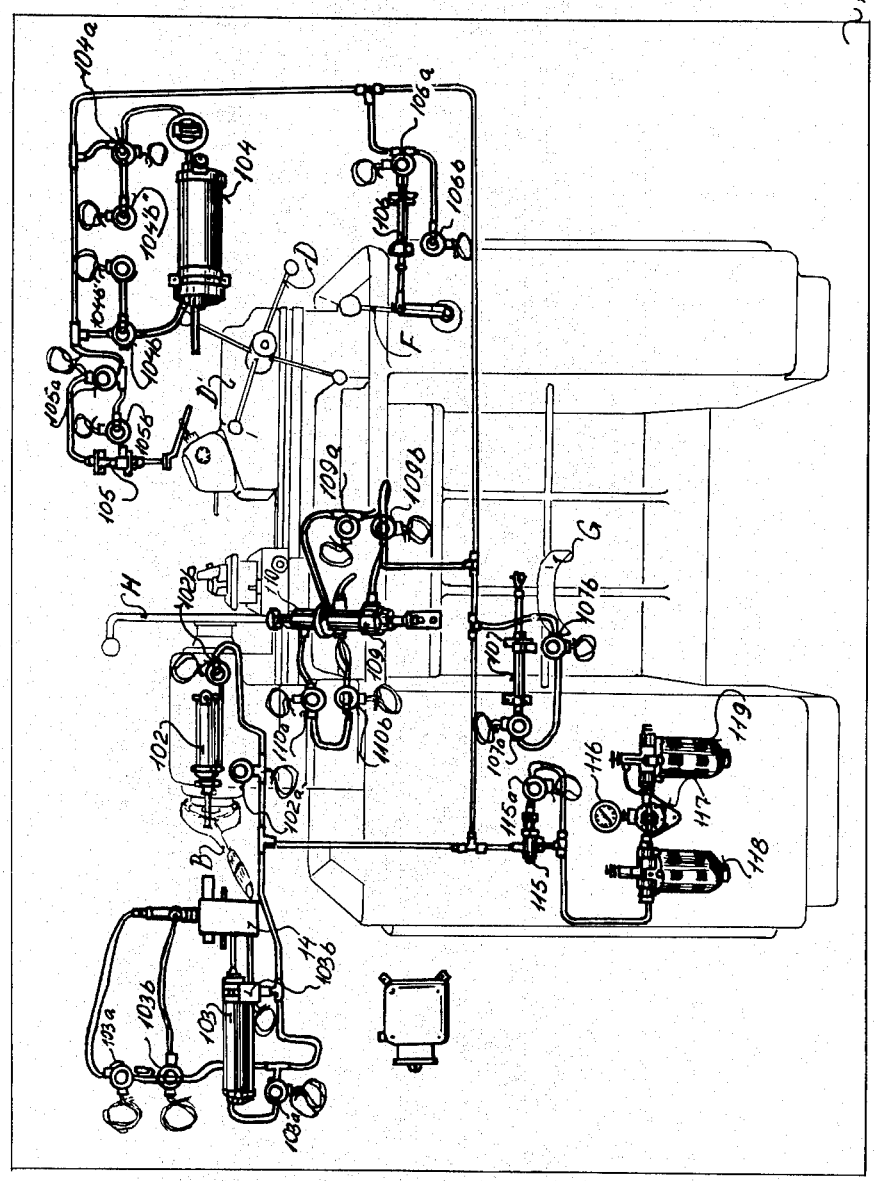
Figure 5:
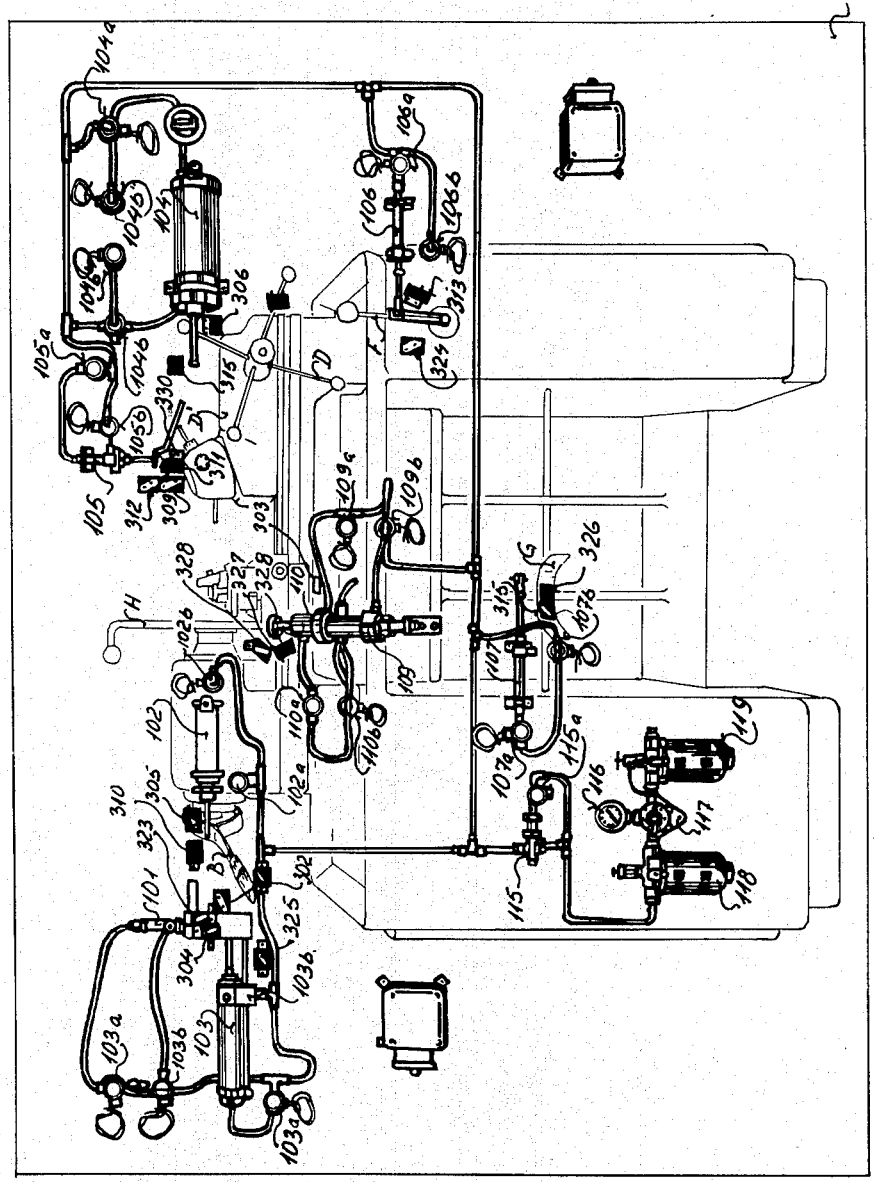
Figure 6:
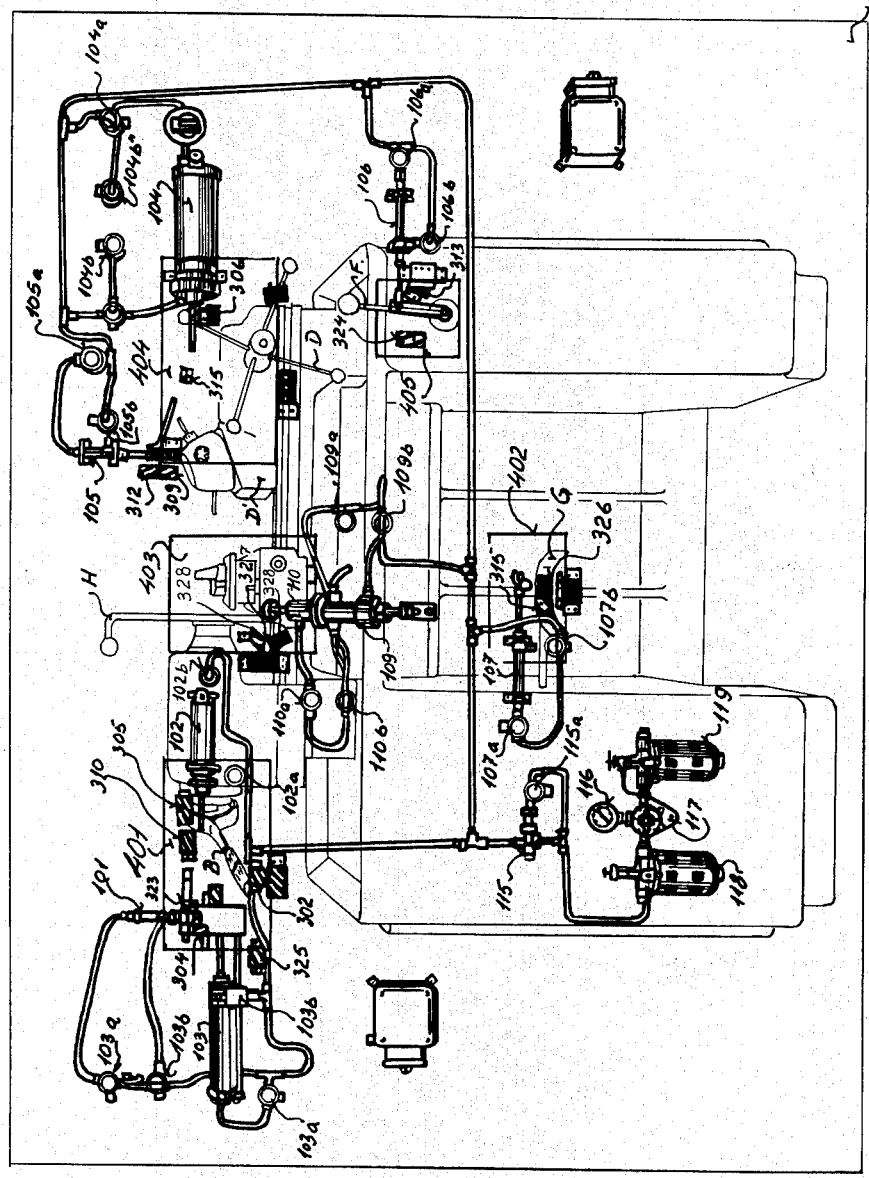
Figure 7:
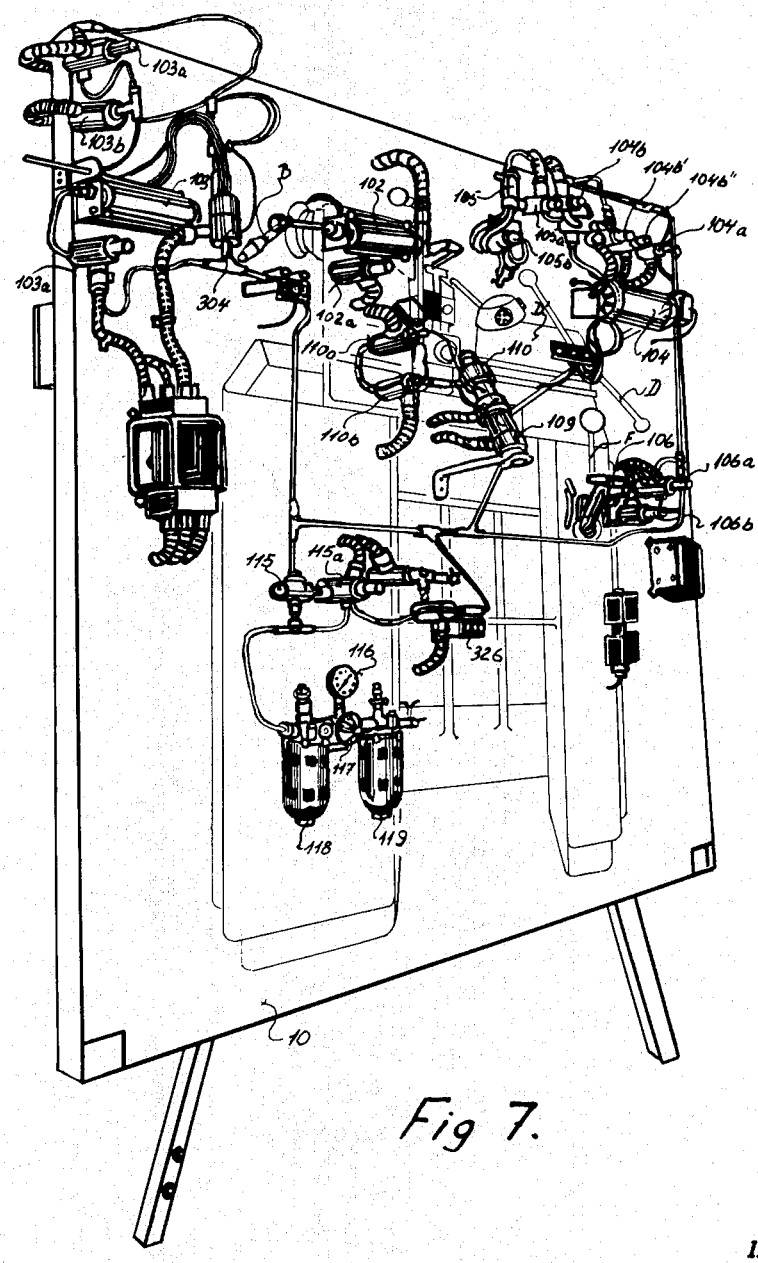
Figure 8:
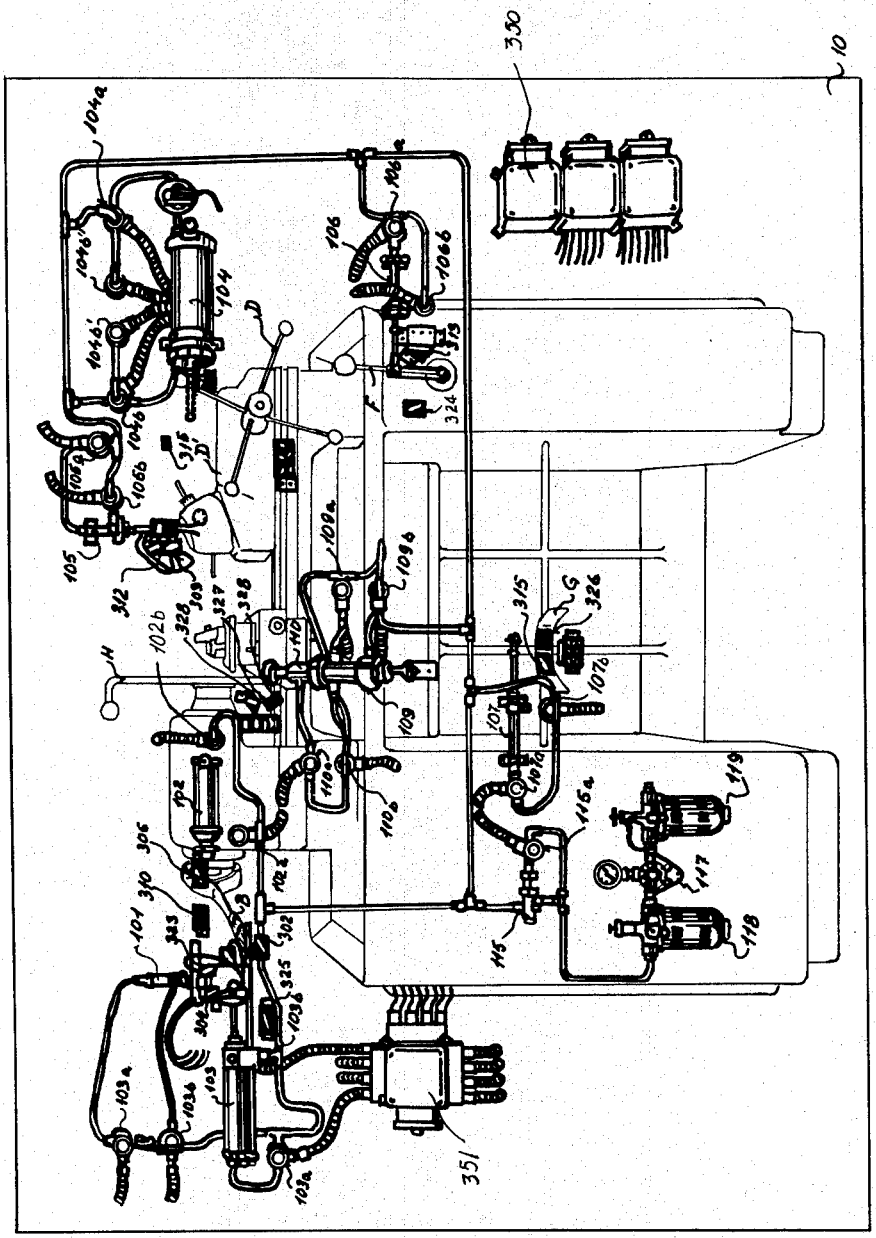
Figure 9:
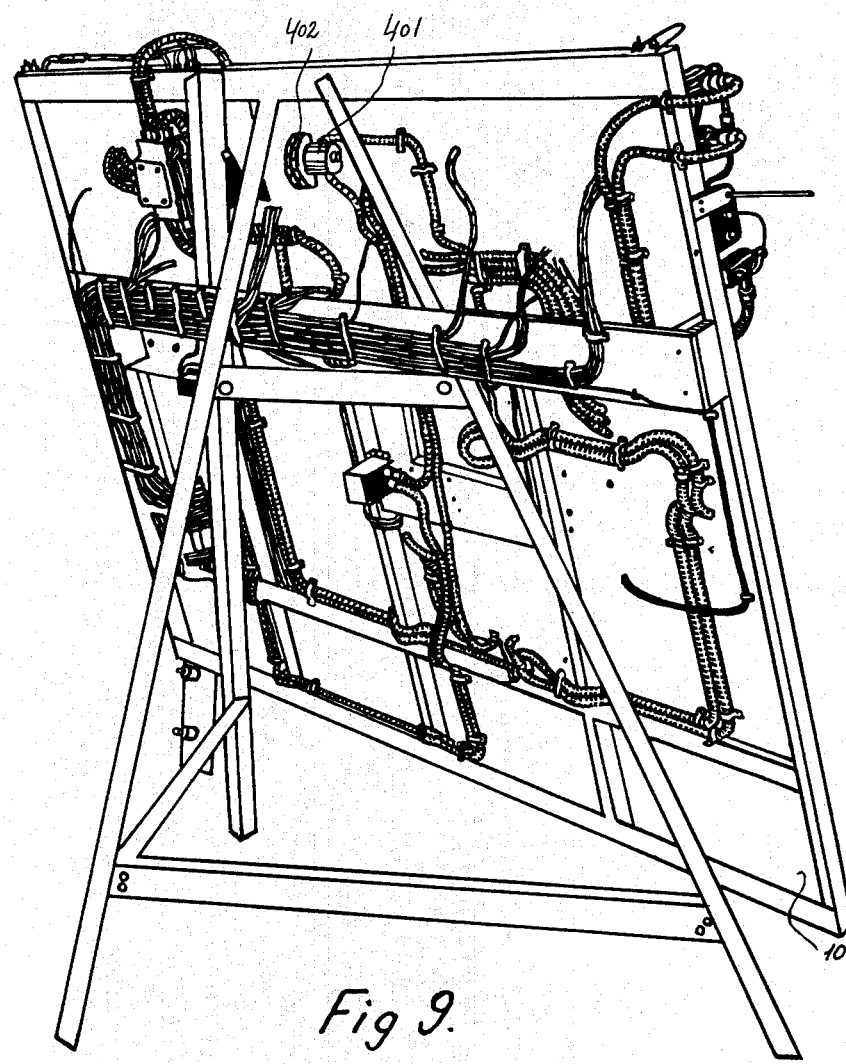
Figure 10:
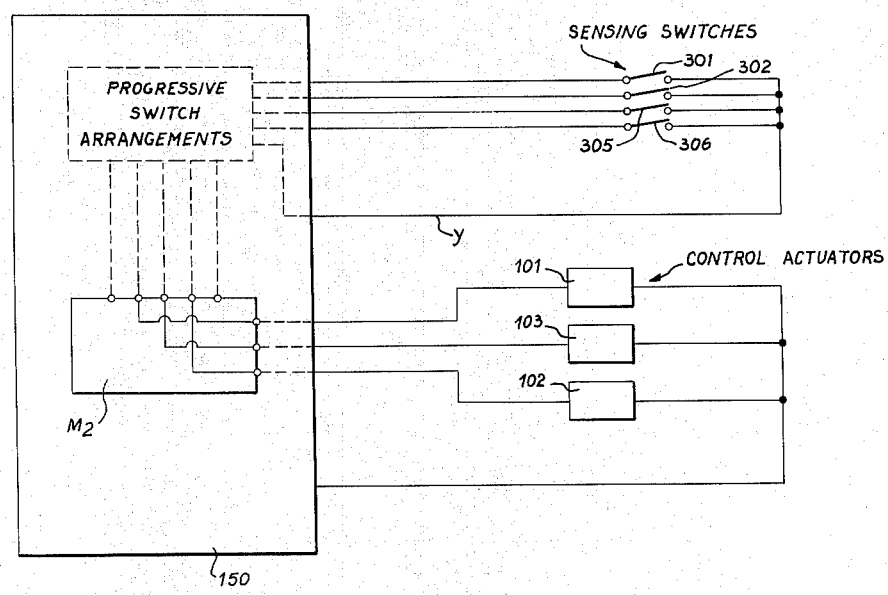

The invention will now be further described with reference to the accompanying drawing, in which FIGURE 1 is a plan view of an illustration of a machine tool mounted on a board forming the equipment according to the present invention, FIGURE 2 is a perspective view of the mounted illustration shown in FIGURE 1, seen from the front side, FIGURE 3 is a plan view as shown in FIGURE 1 with pneumatic or hydraulic cylinders mounted on the board, FIGURE 4 is a plan view as shown in FIGURE 3 in which solenoid valves in addition to the cylinders have been mounted on the board, FIGURE 5 is a plan view as shown in FIGURE 4 in which, in addition to the cylinders and the valves, also sensing switches have been mounted on the board, FIGURE 6 is a plan view as shown in FIGURE 5 in which, in addition to the components previously mentioned, also guards have been mounted on the board, FIGURE 7 is a perspective view of the board with the parts shown in FIGURE 6, FIGURE 8 is a plan view of the board as shown in FIGURES 6 and 7, in which the electrical wiring of the equipment has been completed, FIGURE 9 is a perspective view of the board seen from the rear side showing the electrical wiring, and a few other components, and FIGURE 10 is a schematic diagram illustrating a progressive switch arrangement that may be used with the present invention.

The drawing illustrates an equipment with components designed to automate a machine tool which in addition to the components comprises a substantialy full sized illustration of the machine tool on a flat support on which the components can be mounted in such a manner that they give substantially the same visual impression with respect to the illustration as they would given when mounted in the actual machine.

Hereby it is possible in a simple manner to build up a complete pilot machine equipment which can be tested and run through its cycle without having the machine itself available.

The equipment can thereby be used to educate personnel engaged in modernizing existing machines. They can start with a few components necessary to automate a few movements of the machine, and when they have familiarized themselves sufficiently with that part of the machine, further components can be added until the entire equipment has been constructed. The components can be easily mounted on a carrier for the illustration by means of mounting brackets which can be secured to the carrier by screws or bolts. This obviates the need for designing such actual brackets as would be necessary on the machine tool itself.

The illustration of the machine tool can also be used as a planning aid for a consulting engineer.

Now, with more detailed reference to the drawings the machine tool illustrated for the purpose of explaining the invention is a turret lathe.

A photo of the lathe is enlarged into substantially full size scale as illustrated by 10 in FIGURE 1. The photo is mounted on a suitable board such as a wooden board 12 as seen in FIGURE 2. A turret lathe of this type is a traditional machine tool with which the average engineer or technician is believed to be fully acquainted.

The illustrated turret lathe has five manual controls, namely a collet clamp handle B, a transverse slide handle H, a turrent slide handle D for reciprocating the turret slide D' whereby a capstan tool holder is rotated one step in response to each reciprocation of the turret slide, a driving motor speed control handle F and a motor reverse control handle G which is usually operated by the knee.

In the following it is supposed that this type of turret lathe, which not only is a traditional machine tool but also described in great detail in various textbooks, is so commonly known that there is no need to describe it in further detail.

The article to be produced on the lathe is in the form of a predetermined length of a rod having one end chamfered and provided with a screw-threaded hole. This means that in the turret head a drill and a screw tap must be used, and that the transverse slide has a chamfer tool and a cutting-off or parting tool. It is supposed that the chamfer tool operates when the slide is forward and that the cutting off or parting tool operates when the slide moves back.

In order to move the control handles B, H, D, F, and G, cylinders with movable pistons and projecting piston rods of conventional construction are used. The cylinders may be operated by hydraulic or pneumatic pressure, in the embodiment described they are pneumatically operated. The airflow to the cylinders is controlled by solenoid valves.

The first step in the automation is to mount the cylinders which replaces the manual control. To this end, one cylinder 102 is mounted on the front side of the carrier or panel 10, 12 by means of a suitable bracket, for example, a piece of iron strip in such a position as to give substantially the same visual impression as if mounted on the actual machine for moving the control handle B. If the carrier 12 for the photo 10 is a wooden board, the bracket can be mounted by means of wood screws. In a similar manner, a cylinder 104 is mounted to illustrate its relation and connection with the handle D, a cylinder 106 is mounted to show its relation and connection with the handle F, and a cylinder 107 to show its connection and relation with the knee-control G.

Since the transverse slide has to be moved in two different directions from a neutral middle position, two cylinders 109 and 110 are provided, one for controlling the forward movement and the other for controlling the return movement.

In addition to the movements of these handles, the operator of the lathe, during actual operation, would push the rod forward after each cutting off or parting operation after the collet clamp has been opened. Furthermore, the operator would keep an eye on the drill and the screw cap. When the machine has to be run automatically without the operator, it must also include a feed arrangement. This is also shown in FIGURE 3 and comprises a clamping arrangement with a pair of clamping members adapted to engage the rod by means of a cylinder 101 and being movable to forward the rod until it engages a stop on the turret head which is controlled by means of a second cylinder 103.

In order to replace the visual control to determine whether the drill and screw tap are intact, a movable feeler 16 (FIGURE 4) is provided to engage with the end of the drill and the screw tap, respectively, for example in a position of these parts immediately prior to the operative position thereof. The movement of the feeler 16 is controlled by means of a cylinder 105.

The mounting of these cylinders and the few extra parts on the panel 10, 12 is easy and the illustration also enables the correct size of the cylinders to be chosen; if the components had been mounted on the actual machine, this would require designing of mounting brackets which would require drawings to be made and thereafter the mechanical construction thereof. By using the cylinders and sample equipment, mounted on the panel with enlarged illustration of the machine, this portion of the planning can be carried out in hours or days while otherwise it would require weeks.

In addition to the cylinders, the pneumatic equipment further comprises a main valve 115, a pressure meter 116, a pressure regulator 117, and a pair of filters 118 and 119. The first stage of the build-up of the equipment includes the mounting of these parts on the illustration, for example in the places as indicated in FIGURE 3. When training and educating personnel, it should be explained what type of components are used, for example that the main valve 115 may be a solenoid valve which closes automatically to cut off the air supply if the electric current fails. In educating and training, it may also be advisable not to start with the complete equipment shown in FIGURE 3 but for example, to begin only with the equipment shown at the left-hand top corner, i.e., the transport device comprising the clamping arrangement with two clamping members to be moved to be clamped by means of the cylinder 101, and to be reciprocated by means of the piston of the cylinder 103. The next step in the instruction can then be to add the automatic opening and closing of the collet clamp by means of the cylinder 102, etc.

When a group of personnel to be trained has familiarized itself with the functions of the cylinders, and the sequence in which they are to be operated, the next step to be explained is that the air-flow to the cylinders is regulated by means of solenoid valves. Such solenoid valves are standard components and usually a solenoid valve is inserted in the air supply pipe at each end of the cylinder such as exemplified by FIGURE 4 where solenoid valves 101a and 101b are inserted between the air supply pipe at each end of the cylinder 101. In similar manner solenoid valves having the same reference numerals as the appertaining cylinders and index letters a or b are inserted at each end of the other cylinders.

Two different types of such solenoid valves are available on the market. One type is normally open and is called NO type and is closed when it is energized, and the other type is normally closed called NC type and is opened when it is energized. It will be understood that when using a NO type at one end of a cylinder, the air pressure will have access to that end of the cylinder until the valve is actuated. This will determine the initial or normal position of the piston and thereby the position of the control handle actuated by the piston rod. It will further be understood that by planning the system it is necessary to determine the initial or normal position of each of the controls and thereby determine which of the two types of solenoid valves to be used at each end of each cylinder. In the embodiment shown the solenoid valves with index "a" are of the NC type, and the solenoid valves with index "b" are of the NO type.

As shown in FIGURE 4 a further pair of solenoid valves 104b' and 104b" is provided in connection with the cylinder 104. The reason for this is that the turret slide must be capable of being reciprocated at two different speeds, a relatively high speed for drilling and a relatively lower speed for screw cutting. This speed change is in the specific embodiment illustrated obtained by adjusting the supplementary valves 104b' and 104b", both of which are of the NO type, to throttle the air flow when the screw tap is in the operative position. It will be understood, however, that it is possible within the scope of the invention to provide any other type of throttle arrangement in the supply pipe line to the cylinder 104.

The solenoid valves are electrically controlled. The electrical wiring will be described and illustrated more specifically in the following. At the early stage of the instruction as exemplified by FIGURE 4 the electrical leads to each of the solenoid valves are shown as wire coils near the appertaining valves.

Also the solenoid valves can be mounted by means of brackets. In order to complete the equipment, the valves mounted on the board are also connected by way of air supply pipe lines. These pipe lines are shown in FIGURE 4 and extend from the main valve 117 with branches to the different solenoid valves. The connection between the solenoid valves and the stationary ones of the cylinders are made by rigid pipes. The cylinders 101 and 109, 110 respectively are, however, movable. The cylinder 101 moves when the material is transported by means of the cylinder 103, and the cylinders 109, 110 are moved with the transverse slide. Therefore, the connection between these cylinders and their appertaining solenoid valves is made by means of flexible pipe lines, for example plastic pipes.

It will be appreciated that also the addition of the solenoid valves shown in FIGURE 4, can be made in groups, stage by stage, for the purpose of instruction so that one part of the machine after the other is provided with the components mounted on the illustration board.

In the case of manual control, the operator has the feeling in the fingers when one handle has been moved to its exterior position and knows that thereafter the handle has to be moved to another position, and the operator knows that for example the collet clamp handle B must be retained in its right hand clamping position until the whole cycle has been completed when the material has to be transported. In the case of automation equipment this manual sensing must be replaced by an automatic sensing system and such system comprises a plurality of sensing switches which in the embodiment shown are in the form of micro switches as available on the market.

On the actual machine tool these sensing switches will have to be mounted on brackets so as to be actuated by the handles and/or other movable parts of the machine.

On the panel with the illustration, handles cannot move and therefore the switches are arranged to be actuated by the cylinder piston rods.

FIGURE 5 shows the next stage when also the sensing switches are mounted on the board. These switches have, reference being made to the reference numerals used, the following functions:

Switch 302 is actuated from the workpiece rod which is fit into the machine and senses that there is still material present.

Switch 303 is located in a funnel through which the workpiece passes after being parted off and senses that the workpiece has been thrown out.

Switch 304 senses that the transport clamping device 14 is closed.

Switch 305 senses that the transport clamping device 14 is open.

Switch 306 senses that the turret slide is in front position.

Switch 307 senses that the material transport is in forward position.

Switch 309 senses that the tool feeler 16 is in the lower position.

Switch 310 senses that the collet clamp B is closed.

Switch 311 senses that the screw tap is in order.

Switch 312 senses that the tool feeler 16 is in top position.

Switch 313 senses that the motor speed is the high speed.

Switch 314 senses that the motor rotation is forward.

Switch 315 senses that the turret slide is in return position.

Switch 323 senses that the collet clamp B is open.

Switch 324 senses that the motor speed is reduced.

Switch 325 senses that the material transport device has returned.

Switch 326 senses that the motor is reversed.

Switch 327 senses that transverse slide is forward for chamfering.

Switch 328 senses the neutral position of the transverse slide.

Switch 329 senses the back position of the transverse slide for parting off.

Switch 330 senses that the drill is in order.

An analysis of the functions of the machine when run through its cycle will result in listing all these sensing functions, and therefore there are no problems in mounting a sensing switch for each function. The sensing switches are also connected with electrical leads, but in similarity with the leads to the solenoid valves the completion of the electrical circuits is the last part of the scheme.

The sensing switches are mounted on the panel board in a similar manner as the other components, for example by means of wooden screws.

While in the case of manual operation of the machine no safety measures are necessary, it is in the case of a machine with automatically movable parts desirable or even necessary to prevent access to such movable parts and as shown in FIGURE 6 guards are provided as follows:

Guard 401 prevents access to the material transport.

Guard 402 prevents access to the motor reversing control.

Guard 403 prevents access to the transverse slide.

Guard 404 prevents access to the turret slide control, and

Guard 405 prevents access to the motor speed control.

These guards may be transparent plates in which a thin electric wire is embedded which will break if the guard breaks. The wire is connected with a pair of plug pins by means of which the guard is plugged into a socket mounted on the panel board in the position as shown in FIGURE 6.

At this stage, the full size illustration of the machine with the components mounted thereon appear as shown in the perspective view of FIGURE 7.

It will be appreciated that nothing hereinbefore mentioned has relation to electrical circuits or any other complex control arrangement, the entire arrangement described up till now being purely confined to illustrate and render understandable how the machine equipment itself is to be designed.

This relieves the personnel in planning as well as in educating from solving such problems as how to secure the components of the actual machine so that the personnel involved in the program can concentrate on the actual problems and the mode of operation of the machine.

For the personnel planning the automation of a machine, it is also a considerable help only to have to mount the components in correct desired relationship to the parts of the machine on the photo. This is not only time-saving but it causes a surprising improvement of the survey of the problems.

Preferably, the complete automation equipment mounted on the board with the photo, is connected to operate as a pilot machine equipment by means of the plug-in control apparatus as disclosed in the British Patents 878,902 or 878,903 and the corresponding U.S. application Serial No. 689,620, the disclosures of which are hereby made part of the disclosure of the present application.

In FIGURE 7 is shown a plug-in control unit 150 adjacent the panel 10 which connected with the junction box 351 for the solenoid valves through the cable 152 and with the junction box 350 for the sensing switches through the cable 154.

The connection with a part of the machine equipment and the control apparatus forming the progressive switch arrangement is schematically shown in FIGURE 10. The control apparatus comprises a progressive switch arrangement of any conventional construction which is adapted to be advanced step-by-step only by means of the sensing signals from the sensing switches when the sensing switches are closed. FIGURE 10 shows the sensing switches 302, 303, 305, and 306 connected with the control unit by means of individual lines in a common return line. The stepping switch arrangement or progressive switch arrangement which may be a unit selector switch of the type used, for example, in telephone plants has its contacts individually connected with the sensing lines and its switching arrangement included in the common lines $y$. When the contacts of the selector switch are connected with the sensing switch lines in such a manner that a sensing switch is assigned to each stage of the progressive switch and the progress of the progressive switch corresponds to the sequence in which the sensing switches are actuated on the machine, obviously each sensing operation will correspond to a discrete value of the progressive switch. The progressive switch is further branched-off to the solenoid lines and an appropriately wired distributor member $M_2$ provides the cross-connections from the progressive switch arrangement to the lines in which are included the various actions such as indicated only schematically in FIGURE 10 where the actions of the cylinders 101, 102, and 103 are shown included in the other group of individual lines.

The machine equipment can be tested thereby completely when mounted on the panel in such a manner as enables the operator to check all mechanical and electrical operations and to make adjustments.

The pilot equipment is wired according to the British Patent 878,903 with the sensing switches wired in one group of open circuits, and the solenoid valves wired in another group of open circuits.

The leads from all the solenoid valves are connected to a cable box 351 having one connector member for connecting the leads coming from one side of the solenoid valves and a plurality of terminals for each of the leads coming from the other ends.

These terminals are numbered so as to be identifiable for the purposes of correct connection with the control apparatus.

The sensing switches are connected in open circuits to the other cable box 350 with identifiable terminals to enable programming by means of a program chart in accordance with the aforementioned British patents.

It is not believed that correct listing of the actuation of the sensing switches causes any difficulty when the machine functions are analyzed with a bit of common sense.

By analyzing the machine functions in terms of questions, such as:

Is material present (switch 302)?
Has the workpiece been ejected (switch 303)?
Is the transport clamp member closed (switch 304)?
Is the collet clamp B open (switch 305)?
Is the turret slide forward (to provide stop for the material when transported) (switch 306)?
Etc.

It is believed easy to list the actual sequence in which the sensing switches are operated and thereby wire the program plug at the control unit correctly so that when the control unit is plugged in and, if desired, connected with an auxiliary network to provide manual stepping control, the pilot machine equipment can first be run according to the safe starting scheme by means of the auxiliary network and can thereafter be run automatically through its cycle to analyze movements and make adjustments. It is also possible to use the pilot equipment as instruction equipment to illustrate the different ways of fault-finding by means of the auxiliary network.

The wiring of the pilot equipment is shown in the front view of FIGURE 8, and FIGURE 9 shows the board with the wiring made on the other side.

In FIGURE 9, a small electric motor 401 is shown, mounted on the back side of the board with a disc 402 which extends partly through a slot of the board so as to be visible from the front side. The periphery of this disc 402 may be provided with markings to give a stroboscopic effect illustrating the two machine speeds as well as the reversing of the motor. It will be appreciated that in other pilot equipments to be designed within the scope of my invention similar imitations of movement may be used.

Instead of mounting all the equipment on one side of the board, it is possible within the scope of the invention, to make illustrations of the machine from either side and mount the illustrations on each side of the board or on oppositely facing sides of two mounting boards between which the wiring is made so as to have some components on one side and other components on the other side.

When the panel is used for educational purposes, it is advisable to start with relatively simple problems such as the operation of one or two tools with their cylinders and sensing means.

To this end, the enlarged photo can be composed of sections so as to be handled by different teams so that one section, illustrating problems which can be surveyed by one team, is left to one team only, whereafter when each of the teams has terminated their section of the photo and solutions made by each of the teams are put together, the connection between the individual parts of the machine is established under supervision of the teacher.

The enlarged photo also has the considerable advantage for consulting engineers who in many cases will have to inspect the machine and thereafter work out the scheme of automation and give a detailed description in writing together with drawings.

Such inspection can in many cases be avoided by requesting the client to send a number of photos of the machine. The consulting engineer may then have the best and most suitable of these photos enlarged to natural scale, and after mounting the components on the photo according to the scheme outlined above in accordance with the present invention, the consulting engineer has an estimate of the expenses involved in buying the components. The consulting engineer can have another photo made of the components mounted on the photo of the machine which, when forwarded to the client, will be far more illustrating than many pages of written specification.

Though in the foregoing I have only mentioned a lathe as a specific example, it will be understood that my invention is applicable to any other machine tool, the parts and mode of operation of which will be understood from a photo.

I claim:

1. A kit for planning the automation of the sequence of operation of a machine tool comprising a substantially full size illustration of the machine tool in question substantially as it actually appears and mounted on a carrier, and a plurality of parts adapted to be assembled on said full-size illustration in the position thereof corresponding to the eventual installation on the machine thereby to constitute upon assembly on said illustration a pilot control equipment operable to imitate the automated operating cycle comprising sample components to be interconnected in a definite manner for carrying out the machine functions and operating steps including electrically operable control means for said machine function components and sensing means for machine part positions, means for mounting said sample components on said machine tool illustration carrier, means for wiring said electrical control means and said sensing means as a control equipment and means operable to actuate said control equipment to imitate the operation cycle.

2. A model automation equipment for a machine tool having a plurality of automation components, comprising a substantially full size illustration of said machine tool, a mounting board supporting said illustration, means mounting said components of said equipment on said mounting board in substantially correct mutual disposition relatively to the machine parts illustrated, said components including pressure operated machine function members, solenoid valves for controlling pressure fluid to said pressure operated members, and sensing switches for the exterior positions of movable machine parts, said equipment further comprising pressure medium pipelines and pressure supply equipment therefor, as well as electrical wiring including said sensing switches in a first group of circuits and said solenoid valves in a second group of circuits in combination with a control arrangement for running said equipment through a cycle comprising a progressive switch arrangement having a plurality of discrete steps and being operatively included in said first group of circuits with said sensing switches to be advanced only in response to actuation of said sensing switches, the progressive switch arrangement further being included in said second group of circuits with said solenoid valves, and means for energizing the circuits of said second group in predetermined sequence for causing the operation of said machine function means in desired timed relationship to the actuation of said sensing switches.

3. A model automation equipment for a machine tool having a plurality of actuation components, comprising a substantially full size illustration of said machine tool a mounting board supporting said illustration, means mounting said components of said equipment on said mounting board in substantially correct mutual disposition relatively to the machine parts illustrated, said components including pressure operated machine function members, solenoid valves for controlling pressure fluid to said pressure operated members, and sensing switches for the exterior positions of movable machine parts, said equipment further comprising pressure medium pipelines and pressure supply equipment therefor as well as electrical winding including said sensing switches in a first group of open circuits and solenoid valves in a second group of open circuits and connector sockets having a plurality of terminals connected to said circuits in combination with a plug-in control arrangement for running said pilot equipment through a cycle comprising a progressive switch arrangement having a plurality of contacts of a first group included in circuits of a first group for plug-in connection with said first group of circuits including said sensing switches and means for stepping said switch arrangement in response to actuation of each of said circuits of said first group, the progressive switch arrangement further having a plurality of contacts of a second group for plug-in connection to said second group of circuits to include said solenoid valves, and means for rendering said second contacts operable for energizing the circuits of said second group in predetermined sequence for causing the operation of said machine function means in desired timed relationship to the actuation of said sensing switches.

4. A model automation equipment for a machine tool including sample components mounted on a substantially full size illustration of said machine tool in substantially correct mutual disposition relatively to the machine parts illustrated and means for running said components through a predetermined operation cycle, in combination with a plug-in control arrangement comprising a progressive switch arrangement, means for advancing said switch arrangement in response to completion of each machine function of said equipment, and means for rendering each of said operating cycle steps effective in response to advancing of said progressive switch arrangement.

5. The combination of a pilot automation equipment for a machine tool comprising a substantially full size illustration of said machine tool substantially as it actually appears and carrying components and drive means of said pilot equipment in substantially correct mutual disposition relative to the machine parts illustrated in combination with a plug-in control arrangement for running said components of said pilot equipment through a predetermined cycle corresponding to the machine cycle, and a program selecting device for timing the operation of said components.

6. A method for planning and laying out an automation system for a machine tool having a plurality of control elements and operative to perform a plurality of control functions on the machine tool in the sequence of operation thereof, comprising the step of making a substantially full-size illustration of the machine tool in question substantially as it actually appears, mounting said illustration on a support, and laying out the automation system on said support by mounting the actuating and control elements of the automation system in substantially the same position and relationship to the control elements and movable parts of said machine tool as they would occupy in the actual construction of the automation system with the actual machine tool.

7. A kit for planning the automation of a predetermined machine tool by means of pressure-operated cylinders adapted to perform machine functions on the machine, solenoid valves for regulating the flow of pressure means to said cylinders and sensing switches to be actuated in sequence during the automatic operation of the machine tool in question to provide data signals, comprising in combination: a panel having a substantially full size illustration of said machine tool effectively providing the visual impression of the machine tool itself and illustrating the movable parts of said machine tool to be automatically controlled by means of said pressure-operated cylinders, samples of components to be mounted on said panel comprising said cylinders, solenoid valves and switches effectively providing a complete component set operable to automate said machine tool, means for mounting each of said components on said panel at such actual mutual relationship to various illustrated machine parts as to provide visual impressions of the correlation of each component with the appertaining machine part, and means for rendering said components effective to operate in desired sequence including connecting means for operatively connecting said components to simulate the operation cycle of said machine tool to thereby effectively test and evaluate the machine equipment.

8. A kit for planning the automation of a predetermined machine tool by means of pressure-operated cylinders adapted to perform machine functions on a machine, solenoid valves for regulating the flow of pressure means to said cylinders and sensing switches to be actuated in sequence during the automatic operation of the machine tool in question to provide data signals, comprising in combination: a panel having a substantially full size illustration of said machine tool effectively providing the visual impression of the machine tool itself and illustrating the movable parts of said machine tool to be automatically controlled by means of said pressure-operated cylinders, a plurality of parts to be assembled on said full-size illustration in the position thereof corresponding to the eventual installation on the machine thereby to constitute upon assembly on said installation a pilot control equipment operable to imitate the automated operating cycle, said parts being constituted by samples of components to be mounted on said panel comprising said cylinders, solenoid valves and switches effectively providing a complete component set operable to automate said machine tool, means for mounting each of said components on said panel at such actual mutual relationship to various illustrated machine parts as to provide visual impressions of the correlation of each component with the appertaining machine part, and means for rendering said components effective to operate in desired sequence to simulate the operation cycle of said machine tool and to effectively test and evaluate the equipment including connecting means for said cylinders and solenoids valves, pressure means for rendering said cylinders operable, circuit wiring means for connection with said solenoid valves and said sensing switches and extending to at least one terminal socket, and a plug-in control arrangement connectable to said terminal socket.

9. A kit for planning the automation of a predetermined machine tool by means of pressure-operated cylinders adapted to perform machine functions on a machine, solenoid valves for regulating the flow of pressure means to said cylinders, and sensing switches to be actuated in sequence during the automatic operation of the machine tool in question to provide data signals, comprising in combination: a panel having a substantially full size illustration of said machine tool effectively providing the visual impression of the machine tool itself and illustrating the movable parts of said machine tool to be automatically controlled by means of said pressure-operated cylinders, a plurality of parts to be assembled on said full-size illustration in the position thereof corresponding to the eventual installation on the machine thereby to constitute upon assembly on said installation a pilot control equipment operable to imitate the automated operating cycle, said parts being constituted by samples of components to be mounted on said panel comprising said cylinders, solenoid valves and switches effectively providing a complete component set operable to automate said machine tool, means for mounting each of said components on said panel at such actual mutual relationship to various illustrated machine parts as to provide visual impressions of the correlation of each component with the appertaining machine part, and means for rendering said components effective to operate in desired sequence to simulate the operation cycle of said machine tool to thereby effectively test and evaluate the machine equipment including connecting means for interconnecting said components and a control unit for running said components through the operating cycle in predetermined desired sequence and means for connecting said control unit and said components.

10. An aide for automation planning comprising a substantially full-size illustration of a machine tool, as it actually appears and mounted on a board, a plurality of models of pressure-operated cylinders, solenoid valves and switches in size corresponding to the size of the machine tool parts illustrated, connecting means for connecting said cylinders, solenoid valves and switches in the assembled position on said board, and means for supporting said cylinders, solenoid valves and switches on said board in substantially the same position as they would occupy on the actual machine tool to perform the control functions on the various control elements thereof during the automation cycle.

11. An aide for automation planning, comprising a substantially full-size illustration of a machine tool mounted on a board and representing the machine tool substantially as it would actually appear, and a kit comprising automation components for said machine tool, means for supporting said components on said board in substantially the same position as they would occupy on the actual machine tool to perform the control functions on the various control elements thereof during automation cycle, and means for operatively connecting said components to realize simulated control functions on said board.

12. A method for laying out the automation involving the sequence of operation of a machine tool, comprising the steps of
 making a substantially full size illustration of the machine tool in question substantially as it actually appears,
 mounting said illustration on a substantially rigid carrier,
 and assemblying on the thus mounted illustration a pilot control system from components of automation equipment comprised of cylinders having pistons operable by a pressure medium, solenoid valves operable to regulate the flow of the pressure medium to said cylinders and sensing switches operable to detect certain positions of parts of the machine tool, including the steps of mounting said cylinders, solenoid valves and sensing switches on said carrier in substantially the same mutual relationship to the parts of the illustrated machine tool as on the actual machine, wiring said solenoid valves and said sensing switches into a pilot control system to enable the components of said pilot control system to be run through an operating cycle imitating the actual machine cycle under automation operation thereof, operatively connecting a control arrangement with said pilot control system, and test-operating the pilot control system thus mounted on the carrier of said machine illustration by said control arrangement to serve as guide for the lay-out and construction of the actual machine-tool automation equipment in accordance with the pilot control system.

13. A method for laying out the automation involving the sequence of operation of a machine tool having a plurality of machine functions, comprising the steps of
 making a substantially full size illustration of the machine tool in question substantially as it actually appears,
 mounting said illustration on a substantially rigid carrier,
 and assemblying on the thus mounted illustration a pilot control system from components of automation equipment comprised of machine function means operative to carry out the sequential operating steps of the machine functions, of electrically operable control means for controlling said machine function means and of sensing means for detecting certain positions of parts of the machine tool, including the steps of mounting said machine function means, electrical control means and sensing means on said carrier in substantially the same mutual relationship to the parts of the illustrated machine tool as on the actual machine, wiring said electrical control means and said sensing means into a pilot control system to enable the components of said pilot control system to be run through the desired machine operating cycle, and test-operating the pilot control system thus mounted on the carrier of said machine illustration.

14. A method for laying out the automation involving the sequence of operation of a machine tool having a plurality of machine functions, comprising the steps of
 making a substantially full size illustration of the machine tool in question substantially as it actually appears,
 mounting said illustration on a substantially rigid carrier,
 and assemblying on the thus mounted illustration a pilot control system from components of automation equipment comprised of machine function means operative to carry out the sequential operating steps of the machine functions, of electrically operable control means for controlling said machine function means and of sensing means for detecting certain positions of parts of the machine tool, including the steps of mounting said machine function means, electrical control means and sensing means on said carrier in substantially the same mutual relationship to the parts of the illustrated machine tool as on the actual machine, wiring said electrical control means and said sensing means into a pilot control system to enable the components of said pilot control system to be run through the desired machine operating cycle, and test-operating the pilot control system thus mounted on the carrier of said machine illustration by a control arrangement to serve as guide for the lay-out and construction of the actual machine-tool automation equipment in accordance with the pilot control system.

15. A method of training and educating personnel in the automation involving the sequence of operation of a machine tool, comprising the steps of
 making an illustration of the machine tool in question substantially as it actually appears and at a predetermined scale,
 mounting said illustration on a substantially rigid carrier,
 and assemblying on the thus mounted illustration a pilot control system from components of automation equipment comprised of control components operable to carry out the machine functions and the operating steps of the desired sequence of operation and of a size corresponding to the scale of said illustration including the step of mounting said components on said carrier in substantially the same mutual relationship to the parts of the illustrated machine tool as on the actual machine.

References Cited by the Examiner

UNITED STATES PATENTS

| | | | |
|---|---|---|---|
| 1,547,091 | 7/1925 | Baxter | 35—49 |
| 1,833,726 | 11/1931 | Stoddard | 35—49 |
| 1,968,039 | 7/1934 | Hornberger | 35—19.1 |
| 2,173,400 | 9/1939 | Shaw | 35—49 |
| 2,402,109 | 6/1946 | Williams | 35—29.3 |
| 2,565,305 | 8/1951 | Goderiaux. | |
| 2,581,060 | 1/1952 | Wold | 74—2 |
| 2,722,060 | 11/1955 | Flower et al. | 35—13 |

EUGENE R. CAPOZIO, *Primary Examiner.*

REYNOLDS R. EVERETT, ABRAHAM BERLIN, JEROME SCHNALL, *Examiners.*